(12) United States Patent
Debleser

(10) Patent No.: US 6,265,805 B1
(45) Date of Patent: Jul. 24, 2001

(54) ROTOR SHAFT OF SYNCHRONOUS ELECTRIC MACHINE

(75) Inventor: Yves Debleser, Enghien (BE)

(73) Assignee: Jeumont Industrie, Courbevoie (FR)

(*) Notice: Subject to any disclaimer, the term of this patent is extended or adjusted under 35 U.S.C. 154(b) by 0 days.

(21) Appl. No.: 09/355,620

(22) PCT Filed: Feb. 6, 1998

(86) PCT No.: PCT/FR98/00218

§ 371 Date: Oct. 18, 1999

§ 102(e) Date: Oct. 18, 1999

(87) PCT Pub. No.: WO98/35422

PCT Pub. Date: Aug. 13, 1998

(30) Foreign Application Priority Data

Feb. 7, 1997 (FR) .................................................. 97 01448

(51) Int. Cl.⁷ .............................. H02K 1/26; H02K 1/28; H02K 19/00
(52) U.S. Cl. ........................ 310/261; 310/214; 310/216; 310/217; 310/61
(58) Field of Search .............................. 310/261, 42, 264, 310/216, 217, 214, 61; 29/598

(56) References Cited

U.S. PATENT DOCUMENTS

| | | | |
|---|---|---|---|
| 3,870,912 | 3/1975 | Kipke et al. | 310/183 |
| 4,562,641 | 1/1986 | Mosher et al. | 29/598 |
| 4,739,207 | 4/1988 | Ying et al. | 310/214 |
| 5,893,205 * | 4/1999 | McClelland | 29/598 |

FOREIGN PATENT DOCUMENTS

| | | |
|---|---|---|
| 603312 | 9/1934 | (DE) . |
| 0166990 | 1/1986 | (EP) . |
| 0509119 | 10/1992 | (EP) . |
| 0609645 | 2/1993 | (EP) . |
| 2116827 | 6/1972 | (FR) . |
| 2166090 | 8/1973 | (FR) . |
| 364027 | 9/1930 | (GB) . |
| 523311 | 12/1938 | (GB) . |

* cited by examiner

Primary Examiner—Burton S. Mullins
(74) Attorney, Agent, or Firm—Leydig, Voit & Mayer, Ltd.

(57) ABSTRACT

The invention concerns a rotor shaft of a synchronous electric machine with two machined ends parts, framing an electrically active central part having conductors. The active part consists of stacked core disks maintained rigid by rods, the disks having radial notches for the conductors. Invention is applicable to synchronous electric machines.

14 Claims, 3 Drawing Sheets

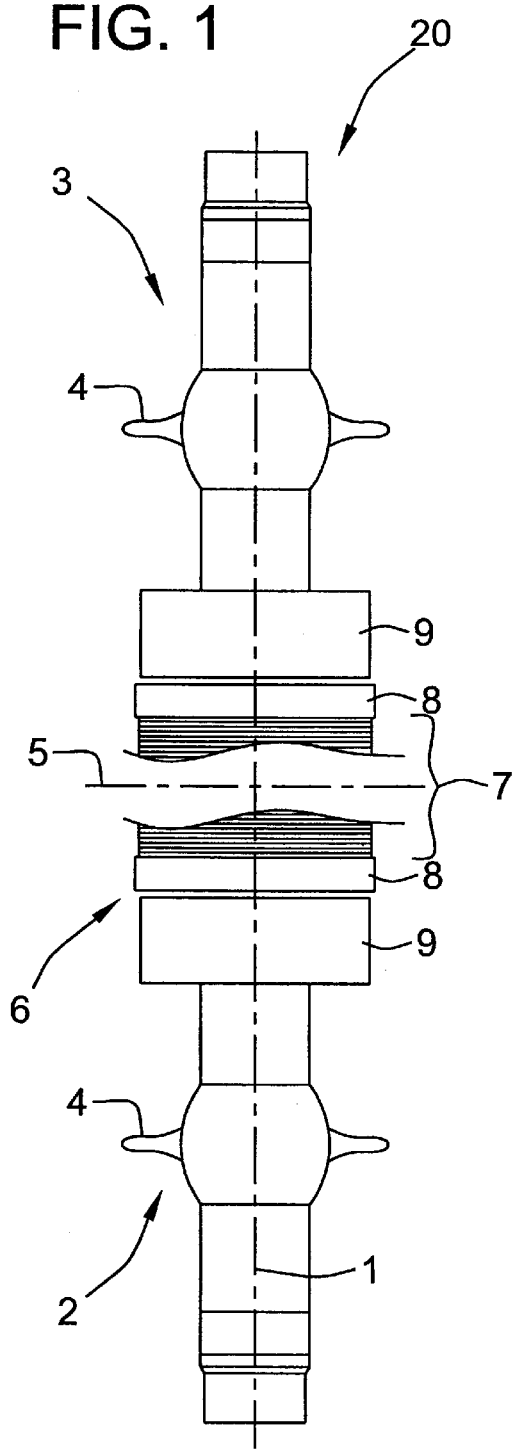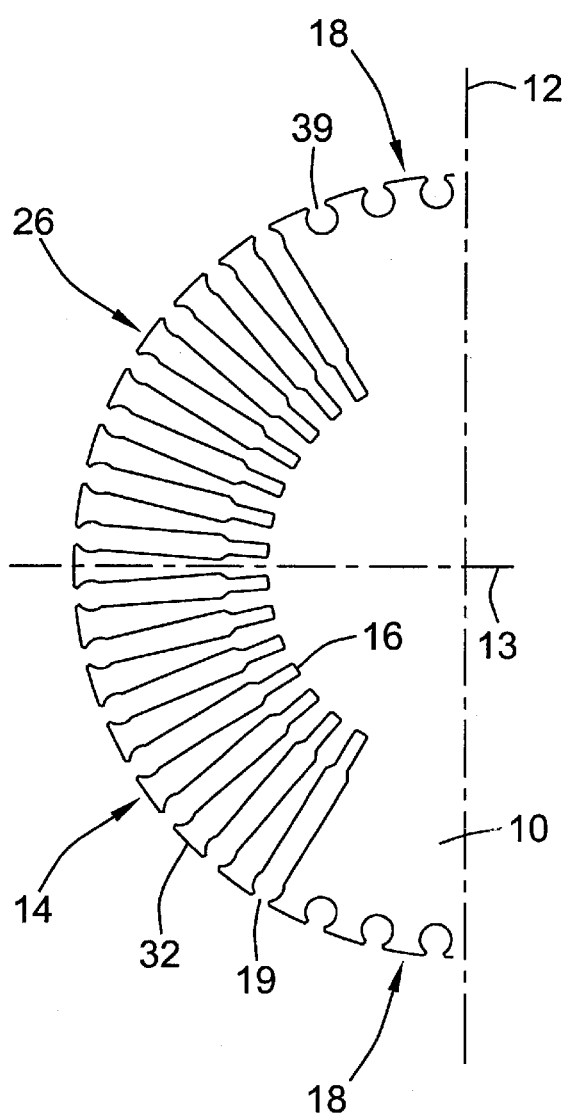

ROTOR SHAFT OF SYNCHRONOUS ELECTRIC MACHINE

FIELD OF THE INVENTION

The invention relates to the field of synchronous electric machines and more particularly relates to a shaft for the rotor of a synchronous electric machine.

BACKGROUND

Such a shaft has two end parts and an electrically active central part with conductors, all produced by machining of a single piece.

The end parts are intended to be placed on two bearings and have an appropriate shape.

In the active central part which forms the rotor of the machine, grooves and deep notches are machined for the electrical conductors. These are coils which must be insulated and maintained in the notches by wedges. This constitutes a difference in construction between synchronous machines and asynchronous machines, in which the conductors are generally conductive bars which do not require insulation or immobilization.

Thus, the costs and time periods for manufacturing shafts for the rotors of synchronous machines are currently high. They constitute a limitation in the manufacturing of electric machines.

It has appeared to be necessary to modify the structure of the rotor shafts of synchronous machines as well as their manufacturing process in order to significantly reduce cost and time of manufacturing.

SUMMARY OF THE INVENTION

For this, the active part of the shaft is made up of a stack of metal sheets, which is maintained rigid by rods, and the metal sheets have a number of radial notches for the conductors.

Preferably, the stack is placed between two end plates, and the rods are welded on said plates.

The following characteristics can also be taken into consideration alone or in any of their technically possible combinations:

- the diameter of the stack is roughly identical to that of the end plates;
- each of the end plates has, on its internal surface, a recess, the stack of metal sheets being fit by each of its ends into the recesses;
- the notches of each metal sheet extend towards the exterior edge of the metal sheet by a hole for the passage of the rods, these rods ensuring the immobilization of the conductors in the notches and the closing of the latter;
- the rods passing through the holes which extend the notches are made of non-magnetic material;
- each metal sheet has at least two zones which are devoid of notches but which have holes for the passage of the rods which preferably open on the exterior edge of the metal sheet;
- the rods passing through the holes of said zones which are devoid of notches are made of magnetic material;
- the metal sheets are glued together in order to improve the strength with regard to twisting of the stack;
- the stack of metal sheets has cooling channels which extend, if necessary, into the end plates;
- the cooling channels communicate, through the intermediary of channels made in the conductors, with ventilation ducts provided on the periphery of the stack;
- the notches of each metal sheet extend, on the opposite side from the exterior edge of the metal sheet, by an opening corresponding to a cooling channel;
- the holes for the rods house a free space between the metal sheet and the rods, when they are in position, so as to create ventilation ducts.

The invention also relates to a process for manufacturing of a rotor shaft of a synchronous electric machine having two end parts framing an electrically active central part and having conductors, the process consisting of machining the two end parts, of producing the central part, and of connecting the three parts together.

According to the invention, the central part is produced by the following successive steps:

- manufacturing of metal sheets which have notches for the conductors and holes for the rods,
- pre-gluing of said metal sheets,
- stacking of said metal sheets,
- insertion of the stack between two end plates,
- insertion of the rods,
- putting the rods in tension,
- welding of the rods on the end plates,
- insertion of the conductors in the notches of the stack, and
- connection of the conductors.

Advantageously, the notches and the holes are formed in the metal sheets by cutting out, particularly by means of a laser beam, since the metal sheets are thin.

BRIEF DESCRIPTION OF THE DRAWINGS

The invention will be better understood, and other aims, advantages and characteristics of it will appear more clearly upon reading of the following description of some non-limiting embodiments of the invention given in reference to the appended drawings in which:

FIG. 1 is a partial top view of a rotor shaft according to the invention,

FIG. 3 is a half-view, according to the axis of symmetry of the poles, of a metal sheet of the active part of the rotor shaft according to the invention.

Figure 2:
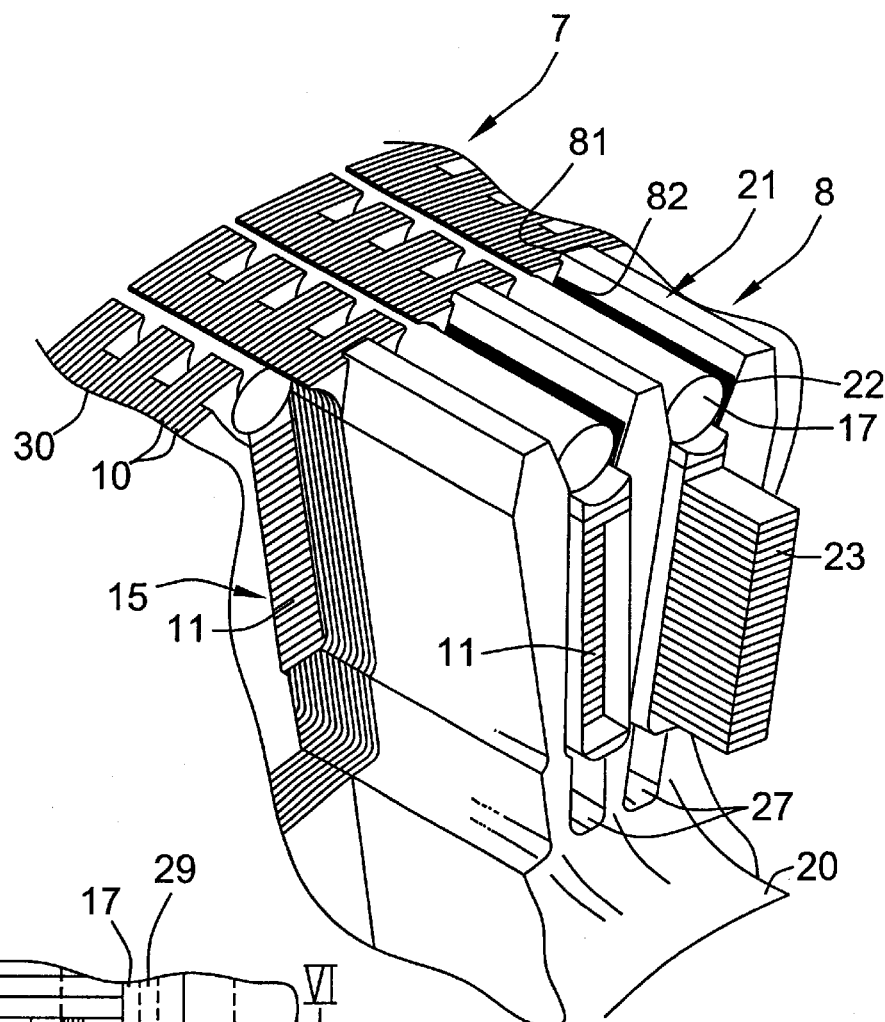
FIG. 2 is a partial view in perspective and in partial section of the active central part of the rotor shaft according to the invention.

The elements common to the different figures will be designated by the same references.

DETAILED DESCRIPTION OF PREFERRED EMBODIMENTS

FIG. 1 shows rotor shaft 20 according to the invention for an electric machine. The axis of the shaft bears the reference 1.

This shaft has two end parts 2 and 3 which are intended for support of the shaft on bearings provided in the machine.

Reference 4 designates ventilation blades which are manufactured independently and then attached on each end part.

They are symmetrical with respect to central axis 5, which is perpendicular to axis 1 and which is also an axis of symmetry.

The central part of the shaft bears the reference 6.

It has electrically active zone 7 which has stacked metal sheets and is maintained between two end plates 8.

The assembly of the metal sheets and the plates is placed between two hoops 9, each of them being connected to one of the end parts 2, and 3 of the rotor shaft.

The diameter of the metal sheets and therefore of the stack is roughly identical to that of end plates 8, which contributes to the proper holding of the stack of metal sheets. The diameter of the metal sheets is preferably slightly less than that of the end plates as will be described in reference to FIG. 2.

FIG. 2 partially illustrates an end plate 8 and an electrically active zone 7 with stacked metal sheets 10 and conductors 11.

For an alternator with two poles, FIG. 3 illustrates a half-section according to axis 12, an axis of symmetry of the poles, of metal sheet 10 which has the general shape of a disk. Metal sheet 10 does not have any bore or central hole. Axis 13 is the axis of symmetry between the poles.

Metal sheet 10 has two series of radial notches 15, a single one of which is illustrated in FIG. 3.

Each notch 15 is designed for receiving a conductor 11. It extends towards edge 26 of the metal sheet in a hole 19 which has a rounded shape for the positioning of rod 17. Rods 17 will thus be arranged at the periphery of the rotor in order to ensure better cohesion.

Reference 32 designates the portion of the exterior edge of the metal sheet between two holes 19. In metal sheet stack 10, these portions 32 form the notch teeth.

Each notch 15 extends, on the opposite side from hole 19, in an opening 16 having width (depending on the circumference of the metal sheet) less than that of notch 15.

Metal sheets 10 are thin sheets whose thickness is generally between 2 and 3 mm.

Thus, notches 15, holes 19 and openings 16 can be produced easily by cutting using a laser beam, for example. This would not be possible with thick sheets in which the notches are necessarily machined.

The time period for manufacturing of the metal sheets is therefore considerably shortened.

In the example illustrated in FIG. 3, between the two series of notches 14, metal sheet 10 has two diametrically opposed zones 18, which do not have notches, in order to create polar parts. These zones 18 however have holes 39 for the passage of rods 17. Preferably, these holes 39 also open on edge 26 of the metal sheet.

Like notches 15, holes 19 and openings 16, holes 39 can be produced easily by cutting; particularly with a laser beam.

This type of metal sheet allows one to produce an alternator with two poles. However, the invention is not limited to this example.

The central part 6 of the shaft is produced in the following manner.

Metal sheets 10 are stacked so that notches 15 coincide with one another.

Metal sheets 10 are preferably pre-glued in order to improve their strength with regard to torsion of the stack.

The stack which is obtained is placed between end plates 8, which are themselves a constitutive part of shaft 20.

As shown by FIG. 2, end plates 8 have radial holes for the passage of the rods 17 and conductors. Each of these plates also has, on the periphery of its interior surface, an recess 82 in which an end of the stack of metal sheets is fitted. This fitting of the ends of the stack ensures better maintaining of the latter. Moreover, shoulders 81 ensure the centering and maintaining of the stack of metal sheets. The diameter of the stack is therefore slightly less than that of the end plates.

Rods 17 are then inserted into holes 19, passing through holes 21 provided in end plates 8.

Rods 17 inserted in holes 39 of the pole parts are preferably made of magnetic material in order to allow passage of flux, and those inserted in holes 19 extended by notches 15 are made of non-magnetic material in order to avoid passage of the flux from one notch tooth 32 to another.

Traction is exerted on rods 17 so as to compress the pre-glued metal sheets.

In the course of this operation, the metal sheets stick together. Rods 17 are then welded onto end plates 8. Reference 22 designates a welding bead.

After welding of the rods on the end plates, the rods are released. They keep the stack of metal sheets rigid.

The conductors are then inserted in notches 15, in which they are immobilized by means of rods 17. The conductors at the end of the plates are finally connected together to form electrical windings.

Figure 4:
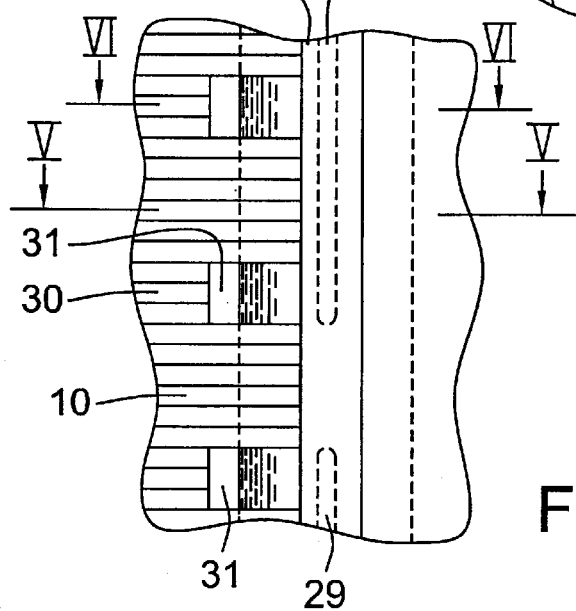
FIG. 4 is a partial developed view of the active part of the rotor shaft according to the invention.
Figure 5:
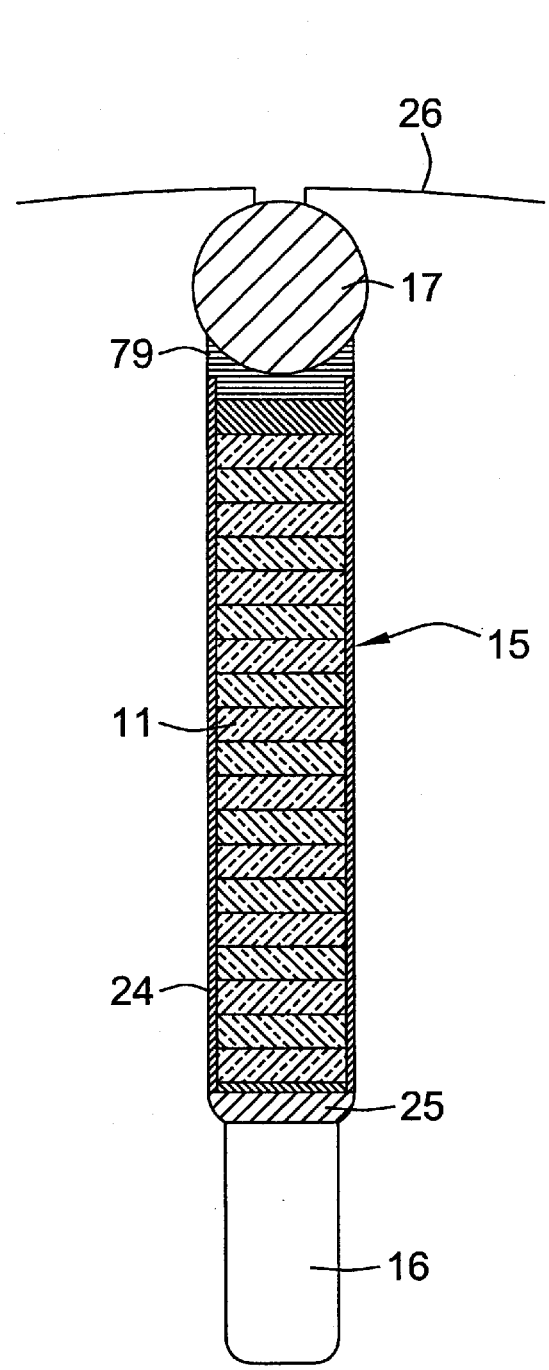
FIG. 5 is a view in section of a notch along line V—V of FIG. 4.

FIG. 5 shows notch 15 in the stack of metal sheets, at the site of line V—V of FIG. 4. The notch contains conductor 11, insulator 24 being placed on the walls of the notch.

Wedge 25 is provided in the bottom of the notch. In hole 19, rod 17 is placed, which immobilizes conductor 11 in notch 15 and closes the latter. Reference 26 designates the exterior edge of the metal sheet.

Opening 16 provided in the metal sheet, in extension of notch 15, is free of any conductor.

The combination of these openings 16, with corresponding openings in end plates 8 form cooling channels 27 which are illustrated in FIG. 2.

Hoops 9 are intended for ensuring the holding of the electric windings and can be in part made of metal or composite material, particularly based on epoxy resin.

Reference 23 designates the part for connection of conductor 11 which is intended to be connected to the electrical circuit of the machine.

FIGS. 2 and 4 show that in the stack of metal sheets, ducts 31 for ventilation are arranged.

Figure 6:
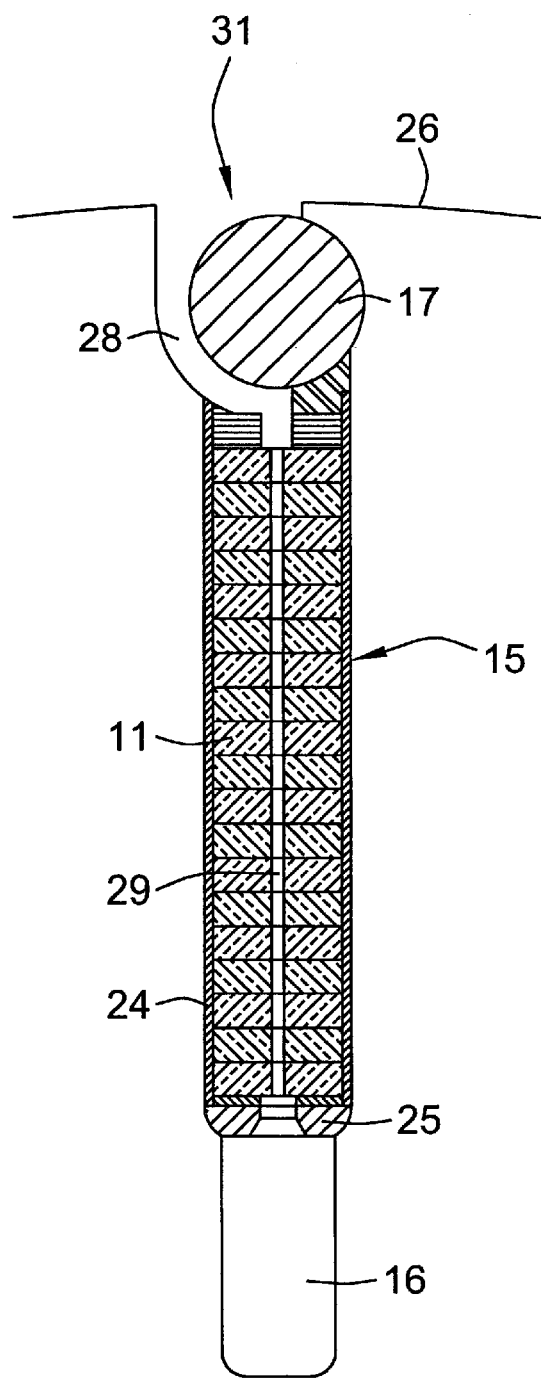
FIG. 6 is a view in section of a notch along line VI–VI of FIG. 4, at the site of a ventilation duct.

FIG. 6 shows notch 15 in the stack of metal sheets, at the site of ventilation duct 31. This figure is a partial view in section taken along line VI—VI of FIG. 4.

It shows that for certain metal sheets 30, at least certain holes 19 or 39 do not have a circular shape but rather a semi-circular shape, so as to house free space 28 between the metal sheet and rods 17, when they are in position.

These particular metal sheets 30 face one another when all the metal sheets are stacked in such a way as to form the ventilation ducts 31.

FIG. 6 shows that duct 31 communicates with cooling channel 16, by the intermediary of channel 29. This channel passes through conductor 11 which is placed in notch 15.

The combination of ventilation ducts 31, intermediate channels 29 and cooling channels 27 makes it possible to cool conductors 11 of the rotor.

Rods 17 hold the metal sheets together and constitute the longitudinal or axial structure of the rotor.

They are placed at the periphery of the stack.

They also perform the function of notch immobilization, by mechanically holding conductors 11 in their notch.

Rods 17 also function as electrical damper since they are connected to end plates 8. They short circuit the leakage currents coming from the metal-stacked active part in the axial direction.

Furthermore, in the examples illustrated in the figures, rods 17 have a circular cross section. However, the invention is not limited to this form; the rods can have any cross section, particularly trapezoidal, rectangular, or square.

The mechanical behavior in terms of flexing of the rotor shaft according to the invention is the following during operation: the forces of compression are taken up by the stack of metal sheets stuck together and the forces of tension are taken up by tightening rods 17.

In torsion, the electrical torque is transmitted by degrees along the active part by the glued interfaces and/or by the forces of adhesion between metal sheets, due to friction.

The sole aim of the reference indications inserted after the technical characteristics mentioned in the claims is to facilitate understanding of these claims and cannot limit their scope.

What is claimed is:

1. A rotor shaft of a synchronous electrical machine having two machined end parts framing an electrically active central part having conductors wherein said active part includes a stack of metal sheets and rods maintaining said stack of metal sheets rigid, each metal sheet having radial notches for respective conductors and holes at an exterior edge of said metal sheet, each notch extending toward and intersecting a respective hole, said rods pass through the holes ensuring immobilization of said conductors in the notches and closing the notches, and said rods are non-magnetic.

2. The rotor shaft according to claim 1, including end plates wherein the stack is placed between said end plates, and said rods are welded to said end plates.

3. The rotor shaft according to claim 2, wherein said stack and said end plates have substantially identical diameters.

4. The rotor shaft according to claim 3, wherein each of said end plates has, on an internal surface, a recess, said stack of metal sheets fitting at each of its ends into the recesses.

5. The rotor shaft according to claim 2, wherein each metal sheet has at least two zones devoid of the notches but including holes and passing respective rods.

6. The rotor shaft according to claim 5, wherein said rods passing through the holes of said zones devoid of notches are magnetic.

7. The rotor shaft according to claim 1, wherein each metal sheet has at least two zones devoid of the notches but including the holes and passing respective rods.

8. The rotor shaft according to claim 7, wherein said rods passing through the holes of said zones devoid of notches are magnetic.

9. The rotor shaft according to claim 1, wherein said metal sheets are glued together.

10. The rotor shaft according to claim 1, including cooling channels which extend into said end plates.

11. The rotor shaft according to claim 10, wherein the cooling channels communicate through channels in said conductors, and including ventilation ducts located on a periphery of said stack.

12. The rotor shaft according to claim 11, wherein the holes passing said rods include free space between said metal sheet and respective rods, creating the ventilation ducts.

13. The rotor shaft according to claim 10, wherein the notches open through respective holes to the cooling channels.

14. The rotor shaft according to claim 2, wherein each of said end plates has, on an internal surface, a recess, said stack of metal sheets fitting at each of its ends into the recesses.

* * * * *